United States Patent [19]

Honda et al.

[11] Patent Number: 5,104,925

[45] Date of Patent: * Apr. 14, 1992

[54] SYNTHETIC RESIN COMPOSITIONS

[75] Inventors: Susumu Honda, Tokyo; Takahiko Sugihara, Kanagawa; Taizo Igarashi, Hyogo; Keiji Hirao, Hyogo; Hisamichi Matsuda, Hyogo, all of Japan

[73] Assignee: Nippon Oil & Fats Co., Ltd., Tokyo, Japan

[ * ] Notice: The portion of the term of this patent subsequent to Aug. 7, 2007 has been disclaimed.

[21] Appl. No.: 406,499

[22] Filed: Sep. 13, 1989

[30] Foreign Application Priority Data

Sep. 13, 1988 [JP] Japan ................................ 63-227409
Sep. 16, 1988 [JP] Japan ................................ 63-229787

[51] Int. Cl.$^5$ .............................................. C08L 37/00
[52] U.S. Cl. ................................... 524/517; 525/207; 525/221; 525/225
[58] Field of Search ............... 526/318.3, 271, 318.2, 526/321; 525/207, 221, 225; 524/517

[56] References Cited

U.S. PATENT DOCUMENTS 4,812,282  3/1989  Hill ........................................ 264/540
4,946,918  8/1990  Akiyama et al. .................. 526/318.3

FOREIGN PATENT DOCUMENTS 0056627  7/1982  European Pat. Off. .
0315167  10/1989  European Pat. Off. .

OTHER PUBLICATIONS

Chemical Abstracts, vol. 107, No. 20, Nov. 16, 1987, p. 196, No. 179312f.
European Search Report and Annex.

*Primary Examiner*—Paul R. Michl
*Assistant Examiner*—Yong S. Lee
*Attorney, Agent, or Firm*—Sughrue, Mion, Zinn, Macpeak & Seas

[57] ABSTRACT

A synthetic resin composition comprising 100 parts by weight of a synthetic resin, from 2 to 900 parts by weight of an inorganic filler, and from 0.02 to 20 parts by weight of a copolymer of a compound represented by formula (1) and maleic anhydride, maleic acid, a maleic acid salt or a maleic acid ester;

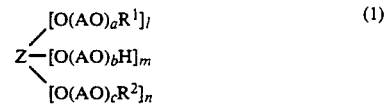

wherein Z is a residue of a compound having from 2 to 8 hydroxyl groups; AO is an oxyalkylene group having from 2 to 18 carbon atoms; $R^1$ is an unsaturated hydrocarbon group having from 2 to 5 carbon atoms; $R^2$ is a hydrocarbon or acyl group having from 1 to 40 carbon; a is from 0 to 1,000, b is from 0 to 1,000, c is from 0 to 1,000, l is an integer of from 1 to 8, m is an integer of from 0 to 2, and n is an integer of from 0 to 7, $l+m+n=2$ to 8, $al+bm+cn=1$ to 1,000, and $n/(l+n) \leq \frac{1}{3}$. In the synthetic resin composition the inorganic filler is uniformly dispersed in the synthetic resin with good efficiency at molding to give excellent molding characteristics and mechanical characteristics.

7 Claims, No Drawings

SYNTHETIC RESIN COMPOSITIONS

FIELD OF THE INVENTION

This invention relates to a synthetic resin composition containing an inorganic filler and more particularly to a synthetic resin composition composed of a synthetic resin, an inorganic filler, and a specific copolymer, wherein the inorganic filler is uniformly dispersed in the synthetic resin with good efficiency at molding to give excellent molding characteristics and mechanical characteristics.

BACKGROUND OF THE INVENTION

It has been widely practiced to add an inorganic filler to a synthetic resin for the improvement of the mechanical characteristics of the synthetic resin moldings, the reduction of the raw material cost, etc.

However, when a large amount of an inorganic filler is added to a synthetic resin, the inorganic filler is difficult to disperse which thereby greatly reduces the moldability and, sometimes, extremely reduces the mechanical characteristics of the moldings obtained. This is considered to be caused by the poor affinity of the synthetic resin for the inorganic filler.

Hitherto, for solving such a disadvantage, it has been attempted to improve the affinity of a synthetic resin for an inorganic filler using a coupling agent such as a fatty acid, fatty acid salt, fatty acid ester, and titanate, as described in U.S. Pat. No. 4,812,282.

However, by conventional methods, the improved effect of the affinity of a synthetic resin for an inorganic filler is still insufficient, the addition amount of an inorganic filler is restricted, and the reduction of mechanical characteristics is unavoidable.

SUMMARY OF THE INVENTION

The object of this invention is to provide a synthetic resin composition having high industrial value, wherein the affinity of a synthetic resin for an inorganic filler is improved to increase the dispersibility of the inorganic filler, whereby the molding characteristics and the mechanical characteristics are improved even by compounding the inorganic filler with the synthetic resin.

It has now been discovered that the aforesaid object can be attained by the present invention as set forth herein below.

According to this invention, there is provided a synthetic resin composition comprising 100 parts by weight of a synthetic resin, from 2 to 900 parts by weight of an inorganic filler, and from 0.02 to 20 parts by weight of a copolymer of a compound represented by following formula (1) and maleic anhydride, maleic acid, a maleic acid salt, or a maleic acid ester;

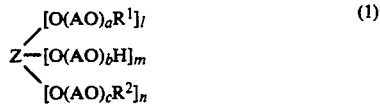
(1)

wherein Z is a residue of a compound having from 2 to 8 hydroxyl groups; AO is an oxyalkylene group having from 2 to 18 carbon atoms; $R^1$ is an unsaturated hydrocarbon group having from 2 to 5 carbon atoms; $R^2$ is a hydrocarbon or acyl group having from 1 to 40 carbon; a is from 0 to 1,000, b is from 0 to 1,000, c is from 0 to 1,000, l is an integer of from 1 to 8, m is an integer of from 0 to 2, and n is an integer of from 0 to 7, $1+m+n = 2$ to 8, $al+bm+cn = 1$ to 1,000, and $m/(l+n) \leq \frac{1}{3}$.

DETAILED DESCRIPTION OF THE INVENTION

The compound shown by formula (1) is explained in detail below.

In formula (I) described above, examples of the compound containing Z as a residue and having from 2 to 8 hydroxy groups, include polyhydric phenols such as catechol, resorcin, hydroquinone, and phloroglucin; polyhydric alcohols such as ethylene glycol, propylene glycol, butylene glycol, dodecylene glycol, octadecylene glycol, neopentyl glycol, styrene glycol, glycerol, diglycerol, polyglycerol, trimethylolethane, trimethylolpropane, 1,3,5-pentanetriol, erythritol, pentaerythritol, dipentaerythritol, sorbitol, sorbitan, sorbide, a sorbitol-glycerol condensate, adonitol, arabitol, xylitol, and mannitol; saccharides such as xylose, arabinose, ribose, rhamnose, glucose, fructose, galactose, mannose, sorbose cellobiose, glucose, fructose, galactose, mannose, sorbose, cellobiose, maltose, isomaltose, trehalose, sucrose, raffinose, gentianose, an melezitose; and the partially etherified or partially esterified compounds thereof.

As the oxyalkylene group having from 2 to 18 carbon atoms shown by AO in formula (I), there are an oxyethylene group, an oxypropylene group, an oxybutylene group, an oxytetramethylene group, an oxystyrene group, an oxydodecylene group, an oxytetradecylene group, an oxyhexadecylene group, and an oxyoctadecylene group; the oxyalkylene group may be single or an adduct of a mixture of two or more of these groups. With adducts of two more of these groups, they may be random or block adducts.

As the unsaturated hydrocarbon group having from 2 to 5 carbon atoms shown by RI, may be mentioned hydrocarbon groups having an unsaturated bond at the terminal, such as a vinyl group, an allyl group, a methallyl group, a 3-butenyl group, a 4-pentenyl group, and a 3-methyl-3-butenyl group.

As the hydrocarbon group having from 1 to 40 carbon atoms represented by $R^2$, there are a methyl group, an ethyl group, a propyl group, an isopropyl group, a butyl group, an isobutyl group, a tert-butyl group, an amyl group, an isoamyl group, a hexyl group, a heptyl group, a 2-ethylhexyl group, an octyl group, a nonyl group, a decyl group, an undecyl group, a dodecyl group, an isotridecyl group, a tetradecyl group, a hexadecyl group, an isohexadecyl group, an octadecyl group, an isooctadecyl group, an oleyl group, an octyldodecyl group, a docosyl group, a decyltetra decyl group, a benzyl group, a cresyl group, a butylphenyl group, a dibutylphenyl group, an octylphenyl group, a nonylphenyl group, a dodecylphenyl group, a dioctylphenyl group, a dinonylphenyl group, a styrenated phenyl group, and a naphthyl group.

The acyl group represented by $R^2$ may be that derived from acetic acid, propionic acid, butyric acid, isobutyric acid, caproic acid, caprylic acid, 2-ethylhexanoic acid, pelargonic acid, capric acid, lauric acid, myristic acid, palmitic acid, isopalmitic acid, margaric acid, stearic acid, isostearic acid, arachic acid, behenic acid, palmitoleic acid, oleic acid, linoleic acid, linolenic acid, erucic acid, and benzoic acid.

As the maleic acid salt there may be mentioned ammonium salts, salts of monoamines such as methylamine, ethylamine, propylamine, butylamine, hexylamine, octylamine, 2-ethylhexylamine, nonylamine, decylamine, dodecylamine, isotridecylamine, tetradecylamine, hexadecylamine, isohexadecylamine, octadecylamine, isooctadecylamine, oleylamine, linolamine, octyldodecylamine, docoylamine, decyltetradecylamine, and aniline; the salts of polyamines such as ethylenediamine, tetramethylenediamine, dodecylpropylenediamine, octadecylpropylenediamine, oleypropylenediamine, diethylenetriamine, triethylenetetramine, tetraethylenepentamine, and pentaethylene hexamine; the salts of alkanolamines such as monoethanolamine, diethanolamine, triethanolamine, monoisopropanolamine, diisopropanolamine, triisopropanolamine, and the alkylene oxide adducts of the aforesaid monoamines or diamines; and the salts of amino acids such as lysine, arginine, and histidine; the salts of alkali metals such as lithium, sodium, and potassium; and the salts of alkaline earth metals such as magnesium, and calcium.

As the maleic acid ester there may be mentioned esters with alcohols such as methanol, ethanol, allyl alcohol, methallyl alcohol, propanol, isopropanol, butanol, isobutanol, tert-butanol, pentanol, isopentanol, hexanol, heptanol, 2-ethylhexanol, octanol, nonanol, decanol, undecanol, dodecanol, isotridecanol, tetradecanol, hexadecanol, isohexadecanol, octadecanol, issoctadecanol, oleyl alcohol, octyldodecanol, docosanol, and decyltetradecanol.

The copolymer for use in this invention can be obtained by copolymerizing the compound represented by formula (I) with maleic anhydride, maleic acid, a maleic acid salt, or a maleic acid ester, using a radical catalyst. Also, the copolymer with maleic acid or a salt or an ester thereof is obtained through esterification, hydrolysis, and subsequent neutralization of a copolymer of maleic anhydride.

The copolymerization of the compound of formula (I) with maleic anhydride, maleic acid, a maleic acid salt, or a maleic acid ester may be performed with the addition of a copolymerizable monomer such as styrene, α-olefin, isobutylene, diisobutylene, and vinyl acetate, and the proportion of the compound of formula (I) is preferably at least 30 mol%.

The weight average molecular weight of the copolymer is from 1,000 to 2,000,000, and preferably from 10,000 to 500,000.

When l in formula (I) is 1, a linear copolymer is obtained, while when l is 2 or more, a cross-linked copolymer is obtained. With regard to the relationship among l, m and n, no preferred copolymer is obtained when $m/(l+n)$ is larger than $\frac{1}{3}$. Also, the copolymer of formula (I) wherein the total number of oxyalkylene groups $(al+bm+cn)$ is over 1,000 is difficult to obtain.

For uniformly dissolving or dispersing the compound of formula (I) in a synthetic resin and uniformly dispersing an inorganic filler in the synthetic resin, the aforesaid ranges in the compound of formula (I) are necessary but in the compound of formula (I), it is preferred that Z is a residue of a compound having from 2 to 6 hydroxyl groups, AO is an oxyalkylene group having from 3 to 4 carbon atoms, R¹ is an unsaturated hydrocarbon group having 3 or 4 carbon atoms, $R^2$ is a hydrocarbon group having from 1 to 24 carbon atoms or an acyl group, a is from 0 to 200, b is from 0 to 200, c is from 0 to 200, l is from 1 to 5, m is from 0 to 2, n is from 0 to 5, $l+m+n$ is from 2 to 6, $al+bm+cn$ is from 1 to 200, and $m/(l+m) \leq 166$.

In the copolymer for use in this invention, the extent of a hydrophilic property and a lipophilic property thereof can be changed by changing Z, AO, R¹, $R^2$, a, b, c, l, m and n and the extent of them can be properly selected according to the kinds of the synthetic resin and the inorganic filler being used.

Examples of the synthetic resin for use in this invention include polyamides such as Nylon 6, Nylon 6,6, Nylon 12, and polyphenylene terephthalamide; polyesters such as polyethylene terephthalate, polybutylene terephthalate, and polyarylate; polyolefins such as polyethylene and polypropylene; polycarbonate; polyacetal; polyphenylene oxide; polyimide; polystyrene; acrylonitrile-styrene copolymer; acrylonitrile-butadiene-styrene terpolymer; polyvinyl chloride; polyvinylidene chloride'; polyvinyl acetate; polymethyl methacrylate; polyethyl acrylate; an unsaturated polyester resin; a phenol resin; a melamine resin; a diallyl phthalate resin; a urethane resin; a silicone resin; an epoxy resin, a fluorine resin, etc.

As the inorganic filler for use in this invention, there may be mentioned silicates such as kaolin, aluminum silicate, clay, talc, mica, asbestos, calcium silicate, sericite, and bentonite; carbonates such as calcium carbonate, magnesium carbonate, barium carbonate, and dolomite; sulfates such as calcium sulfate, barium sulfate, etc., metal oxides such as magnesia, alumina, antimony oxide, titanium oxide, colloidal silica, diatomaceous earth, and ferric oxide; metal hydroxides such as aluminum hydroxide, magnesium hydroxide, calcium hydroxide, ferric hydroxide, and metatitanic acid; and various inorganic powders, aggregates, inorganic fibers, etc., such as silicon carbide, silicon nitride, boron nitride, zirconia, barium titanate, satin white, carbon black, graphite, sands, gravel, glass fibers and rock wool.

In the composition of this invention, the inorganic filler is from 2 to 900 parts by weight, preferably from 3 to 200 parts by weight and the copolymer is from 0.02 to 20 parts by weight, and preferably from 0.03 to 10 parts by weight, per 100 parts by weight of the synthetic resin. If the proportion of the inorganic filler is less than 2 parts by weight, the improvement of the mechanical characteristics by the inorganic filler cannot be expected. Also, if the proportion of the inorganic filler is over 900 parts by weight and the proportion of the copolymer is less than 0.02 part by weight, the effect of this invention is not sufficiently obtained to reduce the modability and the mechanical characteristics thereof. Furthermore, if the proportion of the copolymer is over 20 parts by weight, the mechanical characteristics of the moldings are reduced.

To the synthetic resin composition of this invention can be, if necessary, added ordinary additives such as antioxidants, ultraviolet absorbers, lubricants, pigments, antistatic agents, and stabilizers.

The synthetic resin composition of this invention is prepared by sufficiently mixing the synthetic resin, the inorganic filler, and the copolymer as described above, using a mixer such as tumbler, a kneader, and a Henshel mixer, or a mixing roll, a mixing extruder, etc.

At mixing, these three components may be simultaneously mixed or after mixing the copolymer and one of the other compounds, the other one component may be mixed with the mixture. In particular, when the inorganic filler is treated by coating the copolymer thereon and the coated inorganic filler is mixed with the synthetic resin, they are very easily mixed to provide a uniform mixture.

When the synthetic resin composition of this invention is intended for molding, the composition is molded into various moldings such as films, sheets, pipes, blow molding products, and extrusion profiles, by various molding machines such as a molding extruder, calender, and injection molding machine. Also, the invention can be applied to a paint containing a pigment dispersed therein, a sealant containing a filler dispersed therein, a resin concrete kneaded with an aggregate, or a case of mixing an inorganic filler with a synthetic resin.

The copolymer which is used for the synthetic resin of this invention has a hydrophilic group and a lipophilic group to greatly increase the affinity of synthetic resin for an inorganic filler. Accordingly, an inorganic filler is easily dispersed in a synthetic resin at a high concentration, whereby synthetic resin products having excellent characteristics such as strength and appearance can be obtained.

The invention is further described by the following examples. The copolymers used in the examples are shown in Table 1 below. The parts in the examples are by weight.

TABLE 1

| Copolymer No. | Compound of Formula (1) (mol) | Maleic Anhydride (mol) | Other Copolymerizable Component (mol) | Salt (mol) | Ester (mol) | Average Molecular Weight |
|---|---|---|---|---|---|---|
| 1 | $CH_2=CHCH_2O(C_2H_4O)_9CH_3$ | 1.0 | 1.0 | — | — | — | 50,000 |
| 2 | $CH_2=CHCH_2O(C_2H_4O)_{33}CH_3$ | 1.0 | 1.0 | — | — | — | 30,000 |
| 3 | $CH_2=CHCH_2O(C_2H_4O)_{120}CH_3$ | 1.0 | 1.0 | — | — | — | 40,000 |
| 4 | $CH_2=CHCH_2O(C_2H_4O)_7C_{18}H_{37}$ | 1.0 | 1.0 | — | — | — | 35,000 |
| 5 | $CH_2=\overset{CH_3}{\underset{|}{C}}CH_2O(C_2H_4O)_3CH_3$ | 1.0 | 1.0 | — | — | — | 250,000 |
| 6 | $CH_2=CHCH_2OC_2H_4OC_{18}CH_{37}$ | 1.0 | 1.0 | — | — | — | 70,000 |
| 7 | $CH_2=CHCH_2O(C_3H_6O)_{14}C_4H_9$ | 0.8 | 1.0 | Styrene 0.2 | — | — | 30,000 |
| 8 | $CH_2=CHCH_2O(C_2H_4O)_8(C_3H_6O)_2CH_3$ $CH_2=CHCH_2O(C_2H_4O)_9CH_2CH=CH_2$ | 0.8 0.2 | 1.0 | — | — | — | 30,000 |
| 9 | $CH_2=CHCH_2O(C_3H_6O)_{51}CH_2CH=CH_2$ | 0.5 | 1.0 | — | — | — | not less than 30,000 |
| 10 | $H_2CO(C_2H_4O)_5CH_2\overset{CH_3}{\underset{|}{C}}=CH_2$ $\mid$ $HCO(C_2H_4O)_5H$ $\mid$ $HCO(C_2H_4O)_5COC_{17}H_{35}$ $\mid$ $HCO(C_2H_4O)_5COC_{17}H_{35}$ $\mid$ $HCO(C_2H_4O)_5COC_{17}H_{35}$ $\mid$ $H_2CO(C_2H_4O)_5COC_{17}H_{35}$ | 1.0 | 1.0 | — | — | — | 70,000 |
| 11 | $H_2CO(C_2H_4O)_{55}CH_2CH=CH_2$ $\mid$ $HCO(C_2H_4O)_{55}CH_2CH=CH_2$ $\mid$ $H_2C$ $\mid$ $O$ $\mid$ $H_2C$ $\mid$ $HCO(C_2H_4O)_{55}CH_2CH=CH_2$ $\mid$ $H_2COC_8H_{17}$ | 0.2 | 1.0 | — | — | — | 270,000 |
| 12[1)] | $C_9H_{19}-C_6H_4-O(C_2H_4O)_{10}CH_2CH=CH_2$ $CH_2=CHCH_2O\{(C_2H_4O)_5(C_3H_6O)_5\}CH_3$ | 0.8 0.7 | 1.0 | Diisobutylene 0.3 | — | — | 30,000 |
| 13 | $CH_2=\overset{CH_3}{\underset{|}{C}}CH_2O(C_2H_4O)_3CH_3$ | 1.0 | 1.0 | — | — | Ethanol 0.3 | 260,000 |
| 14 | $CH_2=CHCH_2O(C_3H_6O)_{14}C_4H_9$ | 0.8 | 1.0 | Styrene 0.2 | — | Buthanol 0.5 | 35,000 |
| 15 | $CH_2=CHCH_2OC_2H_4OC_{18}H_{37}$ | 1.0 | 1.0 | — | Triethanol amine 0.3 | — | 35,000 |
| 16 | $CH_2=CHCH_2O(C_2H_4O)_9CH_3$ | 1.0 | 1.0 | — | NaOh 0.2 | — | 50,000 |
| 17[1)] | $CH_2=CHCH_2O\{(C_2H_4O)_5(C_3H_6O)_5\}CH_3$ | 0.7 | 1.0 | Diisobutylene 0.3 | NaOh 1.0 | — | 35,000 |

Note:
[1)]The unit in { } is a random addition product

EXAMPLE 1

In a beaker 100 parts of high-density polyethylene (Hi-Zex 5000H, trade name, made by Mitsui Petrochemical Industries, Ltd.), 100 parts of calcium carbonate, and 3 parts of the copolymer shown in Table 2 below were well mixed. The synthetic resin composition thus obtained was kneaded using a 6-inch test roll for 7 minutes at 180° C. and then pressed at a temperature of 190° C. (preheating 3 minutes, heating 3 minutes) and a pressure of 50 kg/cm$^2$ to provide a sheet of 2 mm in thickness. At kneading by the roll, calcium carbonate was quickly kneaded with the highdensity polyethylene and the kneaded mixture could be easily released from the roll.

The sheet thus obtained was cut into a specimen using a dumbbell type III die for vulcanized rubber (JIS K 6301-75) and a tensile test was applied on the specimen in compliance with JIS K 7113-81. The tensile strength at yield and the percent elongation at break are shown in Table 2.

Separately, the same procedure as above was repeated except that stearic acid or calcium stearate which was conventionally used was used as an additive in place of the copolymer or neither the copolymer nor such an additive was used. The results are also shown in Table 2.

TABLE 2

| Copolymer or Additive | Tensile Strength (kg/cm$^2$) | Elongation (%) | Remarks |
|---|---|---|---|
| No. 1 | 203 | 81 | Invention |
| No. 2 | 197 | 78 | Invention |
| No. 3 | 173 | 69 | Invention |
| No. 4 | 206 | 82 | Invention |
| No. 5 | 192 | 77 | Invention |
| No. 7 | 213 | 87 | Invention |
| No. 10 | 206 | 81 | Invention |
| No. 11 | 165 | 52 | Invention |
| No. 13 | 172 | 60 | Invention |
| No. 16 | 181 | 66 | Invention |
| None | 18 | 8 | Comparison |
| Stearic Acid | 82 | 12 | Comparison |
| Calcium Stearate | 103 | 16 | Comparison |

From the results shown in Table 2, it can be seen that the synthetic resin compositions of this invention have high tensile strength and elongation and thus are excellent in mechanical characteristics.

EXAMPLE 2

One hundred (100) parts o the inorganic filler shown in Table 3 bellow was mixed with 3 parts of the copolymer shown in the same table using a Henshel mixer to provide the inorganic filler coated with the copolymer. After mixing the coated inorganic filler and pellet-form polypropylene (UBEPOLIPRO J109G, trade name, made by Ube Industries, Ltd.) so as to give the composition shown in Table 3, the mixture was kneaded by a single screw extruder to provide a pellet-form synthetic resin composition. The synthetic resin composition was molded by an injection molding machine to provide a specimen for tensile testing. A tensile test (JIS K 7113-81) was applied on the specimen and the results are shown in Table 3.

Separately, the same procedure as above was repeated except that stearic acid or calcium stearate was used as additive in place of the copolymer or neither the composition nor such an additive was used. The results are shown in the same table.

TABLE 3

| Copolymer or[1] Additive (parts) | | Inorganic[1] Filler (parts) | | Tensile Strength (kg/cm$^2$) | Elongation (%) | Remarks |
|---|---|---|---|---|---|---|
| No. 1 | 3 | Calcium Carbonate | 100 | 212 | 90 | Invention |
| No. 6 | 3 | Calcium Carbonate | 100 | 242 | 92 | Invention |
| No. 7 | 3 | Calcium Carbonate | 100 | 248 | 92 | Invention |
| No. 8 | 3 | Calcium Carbonate | 100 | 223 | 90 | Invention |
| No. 9 | 3 | Calcium Carbonate | 100 | 203 | 86 | Invention |
| No. 12 | 3 | Calcium Carbonate | 100 | 236 | 91 | Invention |
| No. 14 | 3 | Calcium Carbonate | 100 | 210 | 88 | Invention |
| No. 15 | 3 | Calcium Carbonate | 100 | 230 | 90 | Invention |
| No. 7 | 0.3 | Titanium Oxide | 10 | 310 | 218 | Invention |
| No. 7 | 0.9 | Talc | 30 | 270 | 162 | Invention |
| None | 3 | Calcium Carbonate | 100 | 20 | 8 | Comparison |
| Stearic Acid | 3 | Calcium Carbonate | 100 | 47 | 16 | Comparison |
| Calcium Stearate | 3 | Calcium Carbonate | 100 | 106 | 20 | Comparison |
| Stearic Acid | 0.3 | Titanium Oxide | 10 | 210 | 83 | Comparison |
| Stearic Acid | 0.9 | Talc | 30 | 123 | 36 | Comparison |

Note:
[1] The addition amount is shown by parts to 100 parts of polypropylene

From the results shown in Table 3, it can be seen that the synthetic resin compositions of this invention have high tensile strength and elongation and thus are excellent in mechanical characteristics.

EXAMPLE 3

Five hundred (500) g of precipitated calcium carbonate having a mean particle size of 0.1 μm was mixed with 10 g of the copolymer shown in Table 4 using a Henshel mixer to provide precipitated calcium carbonate coated with the copolymer. After mixing 100 parts of precipitated calcium carbonate coated with the copolymer and 100 parts by polypropylene (UBEPOLYPRO J109G, trade name, made by Ube Industries, Ltd.), the mixture was kneaded using a single screw extruder to provide pellets. The pellets were molded using an injection molding machine. The tensile strength and elongation of the molded products by JIS K 7113-81 are shown in Table 4.

TABLE 3

| Copolymer or Additive | Tensile Strength (kg/cm$^2$) | Elongation (%) | Remarks |
|---|---|---|---|
| No. 1 | 218 | 90.2 | Invention |
| No. 4 | 220 | 90.1 | Invention |
| No. 5 | 212 | 89.2 | Invention |
| No. 7 | 247 | 91.1 | Invention |
| No. 14 | 210 | 87.3 | Invention |
| No. 17 | 238 | 90.2 | Invention |
| Stearic Acid | 45 | 13.5 | Comparison |
| Calcium Stearate | 121 | 20.0 | Comparison |
| None | 21 | 8.2 | Comparison |

From the results shown in Table 4, it can be seen that the polypropylene moldings added with precipitated calcium carbonate coated with the copolymer in this invention have high tensile strength and elongation and thus are excellent in properties.

EXAMPLE 4

Five hundreds (500) g of titanium oxide was mixed with 10 g of the copolymer shown in Table 5 below using a Henshel mixer to provide titanium oxide coated with the copolymer. After mixing 10 parts of the titanium oxide coated with the copolymer and 100 parts of an ABS resin (Denka ABS GR1000, trade name, made by Denki Kagaku Kogyo K.K.), the mixture was kneaded using a single screw extruder to provide pellets. The pellets were molded by means of an injection molding machine. The tensile strength (JIS K 7113-81) and the flexural strength (JIS K 7203-82) of the moldings are shown in Table 5.

TABLE 5

| Copolymer or Additive | Tensile Strength (kg/cm²) | Elongation (%) | Remarks |
|---|---|---|---|
| No. 1 | 412 | 720 | Invention |
| No. 2 | 402 | 711 | Invention |
| No. 4 | 422 | 752 | Invention |
| No. 7 | 433 | 771 | Invention |
| No. 13 | 392 | 692 | Invention |
| No. 17 | 428 | 728 | Invention |
| Stearic Acid | 212 | 527 | Comparison |
| Calcium Stearate | 227 | 562 | Comparison |
| None | 182 | 323 | Comparison |

From the results shown in Table 5, it can be seen that the ABS resins blended with titanium oxide coated with the copolymer have high tensile strength and flexural strength and thus are excellent inn properties.

EXAMPLE 5

One hundred (100) parts of the inorganic filler shown in Table 6 below was mixed with 3 parts of Copolymer No. 7 using a Henshel mixer to provide the inorganic filler coated with the copolymer. After mixing the coated inorganic filler and the pellet-form synthetic resin shown in Table 6 so as to give the composition shown in 6, the mixture was kneaded by means of a single screw extruder to provide a pellet form synthetic resin composition. The synthetic resin composition was molded by an injection molding machine to provide a specimen for strength test. A tensile test (JIS K 7113-81) and a flexural test (JIS K 7203-82) were applied onto the specimen and the results are shown in Table 6.

Separately, the same procedure and test were repeated except that stearic acid was added as an additive in place of copolymer No. 7.

TABLE 6

| Synthetic Resin | Inorganic Filler[1] (parts) | | Tensile Strength (Kg/cm²) | Flexural Strength (kg/cm²) | Remarks |
|---|---|---|---|---|---|
| ABS Resin[2] | Titanium Oxide | 10 | 430 | 760 | Invention |
| ABS Resin[2] | Talc | 30 | 395 | 738 | Invention |
| Polyamide (Nylon 66)[3] | Carbon Black | 20 | 720 | 932 | Invention |
| Polycarbonate[4] | Titanium Oxide | 10 | 582 | 880 | Invention |
| Polybutylene Terephthalate[5] | Titanium Oxide | 10 | 492 | 722 | Invention |
| Polybutylene Terephthalate[5] | Calcium Carbonate | 50 | 403 | 683 | Invention |
| ABS Resin[2] | Titanium Oxide | 10 | 211 | 531 | Comparison |
| ABS Resin[2] | Talc | 30 | 205 | 508 | Comparison |
| Polyamide (Nylon 66)[3] | Carbon Black | 20 | 630 | 812 | Comparison |
| Polycarbonate[4] | Titanium Oxide | 10 | 423 | 712 | Comparison |
| Polybutylene Terephthalate[5] | Titanium Oxide | 10 | 398 | 623 | Comparison |
| Polybutylene Terephthalate[5] | Calcium Carbonate | 50 | 311 | 438 | Comparison |

Notes:
[1] Parts to 100 parts of the synthetic resin
[2] Denki Kagaku Kogyo K.K.: Denka ABS GR-1000
[3] Asahi Kasei Kogyo K.K.: Leona 1300S
[4] Teijin Chemicals Ltd.: Panlite L-1250
[5] Mitsubishi Kasei Corp.: Novadur 5010

From the results shown in Table 6, it can be seen that the synthetic resin compositions of this invention have high tensile strength and flexural strength and are excellent in mechanical characteristics.

While the invention has been described in detail and with reference to specific embodiments thereof, it will be apparent to one skilled in the art that various changes and modifications can be made therein without departing from the spirit and scope thereof.

What is claimed is:

1. A synthetic resin composition comprising 100 parts by weight of a synthetic resin, from 2 to 900 parts by weight of an inorganic filler, and from 0.02 to 20 parts by weight of a copolymer of a compound represented by formula (1) and maleic anhydride, maleic acid, a maleic acid salt or a maleic acid ester;

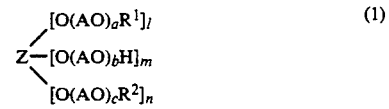

wherein Z is a residue of a compound having from 2 to 8 hydroxyl groups; AO is an oxyalkylene group having from 2 to 18 carbon atoms; $R^1$ is an unsaturated hydrocarbon group having from 2 to 5 carbon atoms; $R^2$ is a hydrocarbon or acyl group having from 1 to 40 carbon atoms; a is from 0 to 1,000, b is from 0 to 1,000, c is from 0 to 1,000, l is an integer of from 1 to 8, m is an integer of from 0 to 2, and n is an integer of from 0 to 7, $1+m+n = 2$ to 8, $al+bm+cn = 1$ to 1,000, and $m/(l+n) \leq \frac{1}{4}$.

2. The synthetic resin composition as in claim 1 wherein the synthetic resin is Nylon 6, Nylon 6,6, Nylon 12, polyphenylene terepthalamide, polyethylene terephthalate, polybutylene terephthalate, polyarylate, polyethylene, polypropylene, polycarbonate, polyacetal, polyphenylene oxide, polyimide, polystyrene, an acrylonitrile-styrene copolymer, an acrylonitrile-butadiene-styrene terpolymer, polyvinyl chloride, polyvinylidene chloride, polyvinyl acetate, polymethyl methacrylate, polyethyl acrylate, an unsaturated polyester resin, a phenol resin, a melamine resin, a diallyl phthalate resin, a urethane resin, a silicone resin, an epoxy resin, or fluororesin.

3. The synthetic resin composition in claim 1, wherein the inorganic filler is kaolin, aluminum silicate, clay, talc, mica, asbestos, calcium silicate, sericite, bentonite, calcium carbonate, magnesium carbonate, barium carbonate, dolomite, calcium sulfate, barium sulfate, magnesia, alumina, antimony oxide, titanium oxide, colloidal silica, diatomaceous earth, ferric oxide, aluminum hydroxide, magnesium hydroxide, calcium hydroxide, ferric hydroxide, metatitanic acid, silicon carbide, silicon nitride, boron nitride, zirconia, barium titanate, satin white, carbon black, graphite, sands, gravel, glass fibers, or rock wool.

4. The synthetic resin composition as in claim 1, wherein in the copolymer of the compound represented by formula (1) and maleic anhydride, maleic acid, a maleic acid salt, or a maleic acid ester, Z is a residue of a compound having from 2 to 6 hydroxyl groups, AO is an oxyalkylene group having from 3 to 4 carbon atoms, $R^1$ is an unsaturated hydrocarbon group having from 3 or 4 carbon atoms, $R^2$ is a hydrocarbon or acyl group having from 1 to 24 carbon atoms, a is from 0 to 200, b is 0 to 200, c is from 0 to 200, l is an integer of from 1 to 5, m is an integer of from 0 to 2, n an integer of is from 0 to 5, $1+m+n=2$ to 6, $al+bm+cn=1$ to 200, and $m/(l+m) \leq \frac{1}{3}$.

5. The synthetic resin composition as in claim 1, which comprises 100 parts by weight of the synthetic resin, from 3 to 200 parts by weight of the inorganic filler, and from 0.03 to 10 parts by weight of the copolymer of the compound represented by formula (1) and maleic anhydride, maleic acid, a maleic acid salt, or a maleic acid ester.

6. A dispersion method of an inorganic filler in a synthetic resin, which comprises adding from 2 to 900 parts by weight of an inorganic filler and from 0.02 to 20 parts by weight of a copolymer of a compound represented by formula (1) and maleic anhydride, maleic acid, a maleic acid salt, or a maleic acid ester to 100 parts of a synthetic resin;

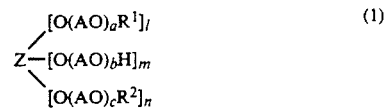

wherein Z is a residue of a compound having from 2 to 8 hydroxyl groups; AO is an oxyalkylene group having from 2 to 18 carbon atoms; R: is an unsaturated hydrocarbon group having from 2 to 5 carbon atoms; $R^2$ is a hydrocarbon or acyl group having from 1 to 40 carbon; a is from 0 to 1,000, b is from 0 to 1,000, c is from 0 to 1,000, l is an integer of from 1 to 8, m is an integer of from 0 to 2, and n is an integer of from 0 to 7, $1+m+n=2$ to 8, $al+bm+cn=1$ to 1,000, and $m/(l+n) \leq \frac{1}{3}$.

7. The dispersion method as in claim 6, wherein the inorganic filler and the copolymer are added to the synthetic resin in the form that the inorganic filler is coated with the copolymer.

* * * * *